(12) United States Patent
Kats et al.

(10) Patent No.: US 11,941,156 B1
(45) Date of Patent: Mar. 26, 2024

(54) SYSTEMS AND METHODS FOR MANAGING PRIVACY POLICY VIOLATIONS

(71) Applicant: GEN DIGITAL INC., Tempe, AZ (US)

(72) Inventors: Daniel Kats, Culver City, CA (US); Johann Roturier, Kildare (IE); Yun Shen, Bristol (GB); David Silva, Dublin (IE)

(73) Assignee: GEN DIGITAL INC., Tempe, AZ (US)

( * ) Notice: Subject to any disclaimer, the term of this patent is extended or adjusted under 35 U.S.C. 154(b) by 403 days.

(21) Appl. No.: 17/245,838

(22) Filed: Apr. 30, 2021

(51) Int. Cl.
*G06F 40/205* (2020.01)
*G06F 21/62* (2013.01)
*H04L 9/40* (2022.01)

(52) U.S. Cl.
CPC ...... *G06F 21/6263* (2013.01); *G06F 21/6254* (2013.01); *G06F 40/205* (2020.01); *H04L 63/0428* (2013.01); *H04L 63/102* (2013.01); *G06F 2221/2119* (2013.01)

(58) Field of Classification Search
CPC .............. G06F 21/6263; G06F 40/205; G06F 21/6254; G06F 2221/2119; H04L 63/0428; H04L 63/102
USPC ......................................................... 726/26
See application file for complete search history.

(56) References Cited

U.S. PATENT DOCUMENTS

| | | | |
|---|---|---|---|
| 10,891,393 B2 * | 1/2021 | Currier | G06F 21/6245 |
| 11,563,778 B1 * | 1/2023 | VanLoo | H04L 63/20 |
| 2006/0143158 A1 * | 6/2006 | Ruhl | G06Q 30/02 |
| 2017/0093917 A1 * | 3/2017 | Chandra | H04L 63/20 |
| 2017/0193249 A1 * | 7/2017 | Luria | H04L 63/0245 |
| 2018/0025454 A1 * | 1/2018 | Redmon | H04N 7/155 705/311 |
| 2018/0144430 A1 * | 5/2018 | Millhouse | G06Q 10/06395 |
| 2018/0197145 A1 * | 7/2018 | LaRowe | G06Q 10/105 |
| 2020/0211031 A1 * | 7/2020 | Patil | G06Q 20/14 |
| 2020/0380171 A1 * | 12/2020 | Bonat | H04L 63/0428 |
| 2021/0081567 A1 * | 3/2021 | Park | G06F 21/6263 |
| 2021/0192651 A1 * | 6/2021 | Groth | G06N 20/00 |
| 2022/0084033 A1 * | 3/2022 | Walters | H04L 63/102 |
| 2022/0207636 A1 * | 6/2022 | Nalluri | G06F 21/6245 |

(Continued)

OTHER PUBLICATIONS

Zimmeck et al., "MAPS : Scaling Privacy Compliance Analysis to a Million Apps", 2019, Sciendo, p. 66-86 (Year: 2019).*

(Continued)

*Primary Examiner* — Thanh T Le
(74) *Attorney, Agent, or Firm* — Greenberg Traurig, LLP (57) ABSTRACT

The disclosed computer-implemented method for managing privacy policy violations may include obtaining, by the computing device, an intermediate representation of a privacy policy, wherein the intermediate representation denotes a formal policy and is generated by extracting the privacy policy in natural language from a website and parsing the privacy policy. The method may also include comparing, by the computing device, behavior of the website against the intermediate representation, thereby detecting at least one violation of the formal policy. The method may further include enforcing, by the computing device, the formal policy at least in part by taking a security action in response to the violation. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2022/0269774 | A1* | 8/2022 | Yucra Rodriguez | G06F 21/566 |
| 2023/0067728 | A1* | 3/2023 | VanLoo | H04L 63/20 |

OTHER PUBLICATIONS

Verderame et al., On the (Un)Reliability of Privacy Policies in Android Apps, "Cornell University Proceedings of the IEEE International Joint Conference on Neural Network", Apr. 18, 2020, p. 1-9 (Year: 2020).*

Hosseini et al., "Identifying and Classifying Third-party Entities in Natural Language Privacy Policies", Proceedings of the Second Workshop on Privacy Language Processing, p. 18-27, 2020 (Year: 2020).*

Cranor, Lorrie Faith, "P3P: Making Privacy Policies More Useful," IEEE Security & Privacy Magazine, Nov./Dec. 2003, pp. 50-55, https://users.ece.cmu.edu/~adrian/630-f05/readings/cranor-p2p.pdf.

Harkous, Hamza, et al., "Polisis, Automated Analysis and Presentation of Privacy Policies Using Deep Learning," USENIX Association, 27th USENIX Security Symposium, Aug. 15-17, 2018, Baltimore, MD, pp. 531-548, https://www.usenix.org/system/files/conference/usenixsecurity18/sec18-harkous.pdf.

Kumar, Vinayshekhar Bannihatti, et al., "Finding a Choice in a Haystack: Automatic Extraction of Opt-Out Statements from Privacy Policy Text," WWW'20, Apr. 20-24, 2020, Taipei, pp. 1-12, https://usableprivacy.org/static/files/kumar_iyengar_www_2020.pdf.

Hosseini, Mitra Bokaei, et al., "Identifying and Classifying Third-party Entities in Natural Language Privacy Policies," Proceedings of the Second Workshop on Privacy in Natural Language Processing, pp. 18-27, https://www.aclweb.org/anthology/2020.privatenlp-1.3.pdf.

TOSDR: Using Crowdsourcing (Included in DuckDuckGo's Privacy Grade, Webpage, printed Apr. 30, 2021, https://tosdr.org/.

Harkous, Hamza, et al., "PriBots: Conversational Privacy with Chatbots," Workshop on the Future of Privacy Indicators, at the Twelfth Symposium on Usable Privacy and Security (SOUPS), Jun. 22, 2016, Denver, Colorado, pp. 1-6, https://www.usenix.org/system/files/conference/soups2016/wfpn16-paper-harkous.pdf.

Oltramari, Alessandro, et al., "PrivOnto: A Semantic Framework for the Analysis of Privacy Policies," Semantic Web, 0(0), IOS Press, pp. 1-20, http://semantic-web-journal.net/system/files/swj1597.pdf.

Anderson, Anne H., "A Comparison of Two Privacy Policy Languages: EPAL and XACML," Sun Microsystems, Inc. SWS'06, Nov. 3, 2006, Alexandria, Virginia, pp. 53-60, https://dl.acm.org/doi/pdf/10.1145/1180367.1180378.

Breaux, Travis D., et al., "Eddy, a formal language for specifying and analyzing data flow specifications for conflicting privacy requirements," ACM Digital Library, Requirements for Engineering, vol. 19, No. 3, https://dl.acm.org/doi/10.1007/s00766-013-0190-7.

Verderame, Luca, et al., "On the (Un)Reliability of Privacy Policies in Android Apps," Cornell University, Proceedings of the IEEE International Joint Conference on Neural Networks (IJCNN 2020), Apr. 18, 2020, pp. 1-9, https://arxiv.org/abs/2004.08559.

Zimmeck, Sebastian, et al., "MAPS: Scaling Privacy Compliance Analysis to a Million Apps," Sciendo, Proceedings on Privacy Enhancing Technologies; 2019, (3) pp. 66-86, https://www.usableprivacy.org/static/files/popets-2019-maps.pdf.

Sanchez-Rola, Iskander, et al., "Can I Opt Out Yet? GDPR and the Global Illusion of Cookie Control," AsiaCCS '19, Jul. 9-12, 2019, Auckland, New Zealand, pp. 1-12, https://igor-santos.net/papers/2019/2019-sanchez-rola-asiaccs-opt-out-GDPR.pdf.

* cited by examiner

SYSTEMS AND METHODS FOR MANAGING PRIVACY POLICY VIOLATIONS

BACKGROUND

A privacy policy is a statement or legal document (in privacy law) that discloses some or all of the ways a party gathers, uses, discloses, and manages a customer's or client's data. Personal information can be anything that can be used to identify an individual, not limited to the person's name, address, date of birth, marital status, contact information, ID issue, and expiry date, financial records, credit information, medical history, where one travels, and intentions to acquire goods and services. In the case of a business, it is often a statement that declares a party's policy on how it collects, stores, and releases personal information it collects. It informs the client what specific information is collected, and whether it is kept confidential, shared with partners, or sold to other firms or enterprises. Privacy policies typically represent a broader, more generalized treatment, as opposed to data use statements, which tend to be more detailed and specific.

Due to regulations, websites typically provide privacy notices that are statements made to data subjects that describe how the organization collects, uses, retains and discloses personal information. A privacy notice is sometimes referred to as a privacy statement, a fair processing statement, a data usage statement, or sometimes a privacy policy. More formally, a privacy policy is distinct from a privacy notice because the policy is an internal document that instructs employees how to collect and use information, whereas the notice informs a website user about the policy and often provides contact information for questions or concerns. However, as used herein, the term "privacy policy" generally refers to a privacy notice and/or a privacy policy, whether contained in a single document or distributed among disparate documents.

Privacy policies are intended to inform website users of the practices of the websites they visit so that the users can make informed decisions about providing information to websites or interacting with websites. However, privacy policies are typically written in legal language with vague terms that encompass a broad range of behaviors. Additionally, the policies are usually of sufficient length that reading the entire policy typically requires at least an hour of a user's time. Also, privacy notices are often difficult to find on a website, and the contents may be distributed among separate documents, such as cookie policies, data processing agreements, and data sub-processor lists. Further, companies often reserve the right to change policies unilaterally, so a user may not be able to rely on a previous understanding of a policy upon a next visit to a website. Moreover, the policy contents distributed among separate documents may be contradictory, and websites sometimes contravene the stated policies. Such a violation can be difficult for a user to detect, and users often do not understand how to report such a violation to a relevant regulatory body. The present disclosure, therefore, identifies and addresses a need for systems and methods for managing privacy policy violations.

SUMMARY

As will be described in greater detail below, the present disclosure describes various systems and methods for managing privacy policy violations.

In one example, a method for managing privacy policy violations may include obtaining, by the computing device, an intermediate representation of a privacy policy, wherein the intermediate representation denotes a formal policy and is generated by extracting the privacy policy in natural language from a website and parsing the privacy policy. The method may also include comparing, by the computing device, behavior of the website against the intermediate representation, thereby detecting at least one violation of the formal policy. The method may further include enforcing, by the computing device, the formal policy at least in part by taking a security action in response to the violation.

In some implementations, obtaining the intermediate representation includes receiving the intermediate representation from a server that performs the extracting and the parsing. Additionally or alternatively, obtaining the intermediate representation may include performing, by the computing device, at least one of the extracting or the parsing.

In some implementations, the security action may include notifying a user of the violation. Alternatively or additionally, the security action may include creating an auto-filled form for a user to submit a complaint to a relevant regulatory body detailing the violation. In additional or alternative examples, the security action may include denying one or more requests to add one or more networks if they are not listed in the privacy policy, denying one or more requests to one or more third parties if they are not listed in a privacy policy, and/or hiding, from a third party not listed in the privacy policy, at least part of one or more requests.

In some implementations, the computing device may carry out the obtaining, comparing, and enforcing by enacting computer-readable instructions that are packaged as a browser extension. Alternatively or additionally, the extracting may include applying a first extraction technique that involves attempting to identify a cookie banner. Additionally or alternatively, the extracting may include applying a second extraction technique that involves looking for a particular word on the website in one or more languages, following one or more links associated with the particular word, downloading one or more documents located at the one or more links, determining if the one or more documents look like privacy policies, and recursively following any links found in all of the one or more documents that look like privacy policies. Alternatively or additionally, the extracting may further include, in response to no privacy policy being found by application of the first extraction technique and the second extraction technique, providing a notification to a user and asking the user to find a privacy policy document on a webpage of the website.

In some implementations, the parsing may employ one or more natural language processing techniques. For example, the parsing may employ a first natural language processing technique that involves semantic role labeling (SRL). Alternatively or additionally, the parsing may employ a second natural language processing technique that involves pattern matching. Alternatively or additionally, the parsing may employ a third natural language processing technique that involves use of a classifier that determines whether a document contains a snippet related to a particular feature of interest.

In one embodiment, a system for managing privacy policy violations may include at least one physical processor and physical memory that includes computer-executable instructions that, when executed by the physical processor, cause the physical processor to extract a privacy policy in natural language from a website. Additionally, the instructions cause the physical processor to parse the privacy policy, thereby generating an intermediate representation that denotes a formal policy. Also, the instructions cause the physical processor to compare behavior of the website against the intermediate representation, thereby detecting at least one violation of the formal policy. Further, the instructions cause the physical processor to enforce the formal policy at least in part by taking a security action in response to the violation.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to extract a privacy policy in natural language from a website. Additionally, the instructions may cause the physical processor to parse the privacy policy, thereby generating an intermediate representation that denotes a formal policy. Also, the instructions may cause the physical processor to compare behavior of the website against the intermediate representation, thereby detecting at least one violation of the formal policy. Further, the instructions may cause the physical processor to enforce the formal policy at least in part by taking a security action in response to the violation.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for managing privacy policy violations. As will be explained in greater detail below, by extracting a privacy policy from a website, detecting a violation of the policy, and enforcing the policy by taking a security action in response to the violation, the disclosed system and method aids users in making informed decisions about sharing information with websites and/or interacting with websites. Extracting the privacy policy in natural language and parsing the privacy policy to generate an intermediate representation that denotes a formal policy makes it possible to automatically detect violations by comparing behavior of the website against the intermediate representation. In implementations in which the security action involves notifying a user of the violation and/or automatically filling a form for the user to report the violation to a relevant regulatory body, the user is empowered to detect and report violations even if a privacy policy and/or website behavior is not perceived or understood by the user. These measures address issues arising when a user cannot find all or part of a privacy policy, does not have time to read and understand the policy, is unaware of a change to a policy, and/or cannot perceive website behavior that violates the policy.

In addition, the systems and methods described herein may improve the functioning of a computing device by detecting security policy violations automatically and communicating the violation to a user, thus reducing a likelihood that the computing device will expose a user's personal data in violation of a privacy policy. These systems and methods may also improve the field of computer security by preventing exposure of users' personal data.

Figure 1:
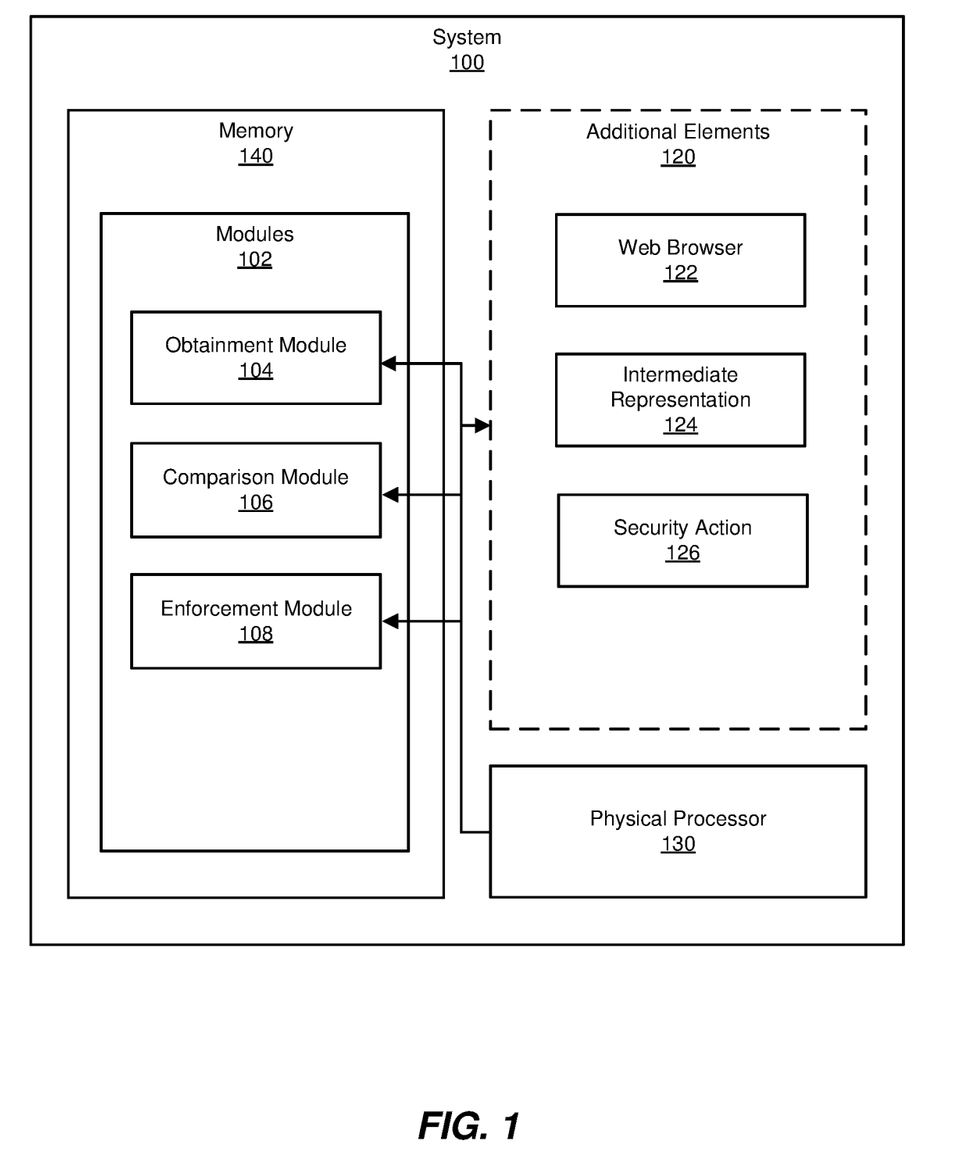
FIG. 1 is a block diagram of an example system for managing privacy policy violations.
Figure 2:
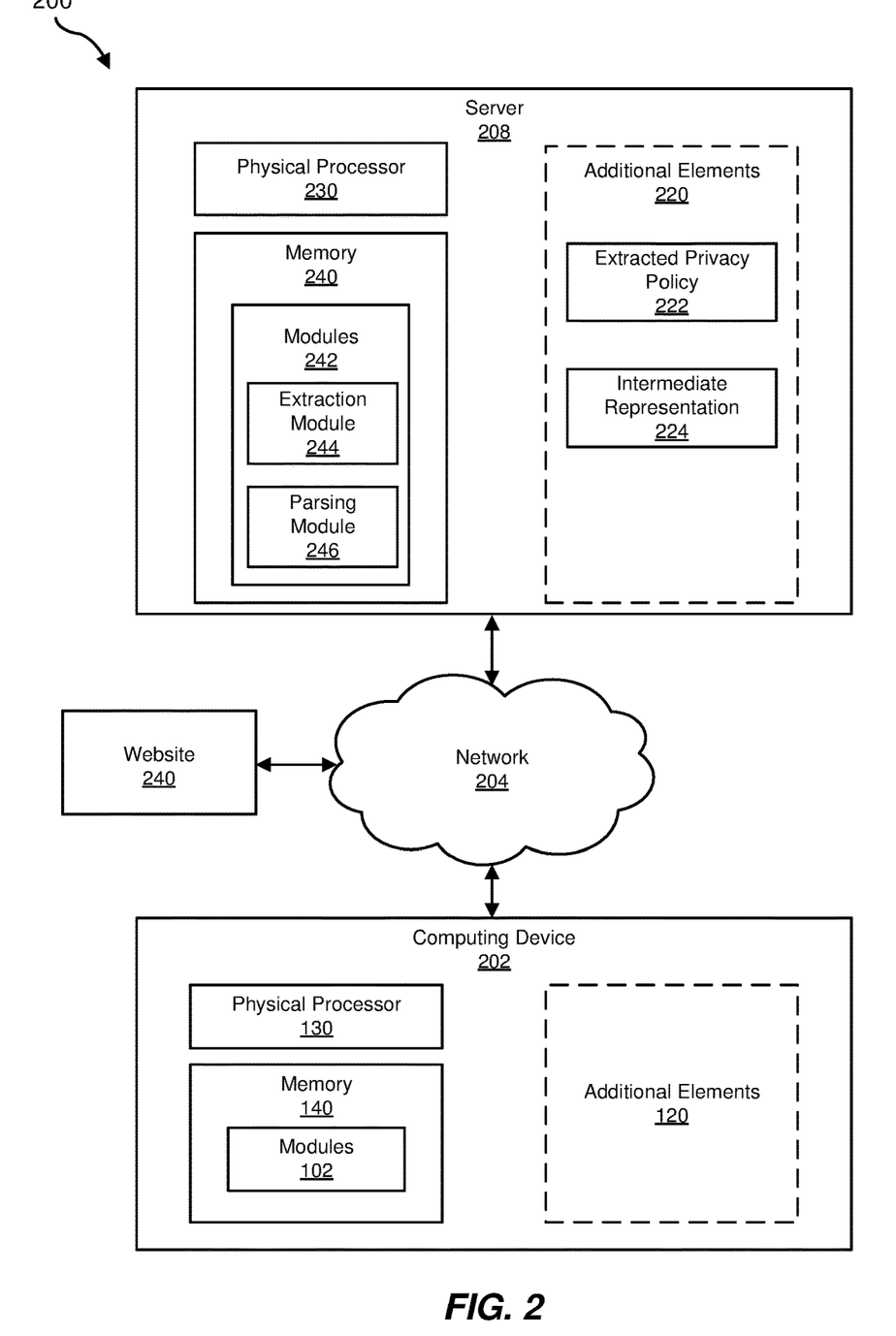
FIG. 2 is a block diagram of an additional example system for managing privacy policy violations.

The following will provide, with reference to FIGS. 1-2, detailed descriptions of example systems for managing privacy policy violations. Detailed descriptions of corresponding computer-implemented methods will also be provided in connection with FIG. 3. Detailed descriptions of privacy policy violation management procedures will also be provided in connection with FIG. 4. Detailed descriptions of example security actions carried out according to implementation of the privacy policy violation management will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for managing privacy policy violations. As illustrated in this figure, example system 100 may include one or more modules 102 for performing one or more tasks. As will be explained in greater detail below, modules 102 may include an obtainment module 104, a comparison module 106, and an enforcement module 18. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing privacy policy violations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as web browser 122. Web browser 122 generally represents any type or form of application software for accessing the World Wide Web. When a user requests a web page from a particular website, the web browser 122 retrieves the necessary content from a web server and then displays the page on the user's device. In one example, web browser may fetch and display web content in response to the user inputting a Uniform Resource Locator (URL) to the web browser 122, which may occur, for example, when the user selects a link in displayed content. Examples of web browser include, without limitation, Google Chrome, Microsoft Edge, Mozilla Firefox, Internet Explorer, Safari, QQ browser, Sogou Explorer, Opera, Yandex Browser, and UC Browser.

Other examples of additional elements 120 include an intermediate representation 124 and/or a security action 126. An extracted privacy policy may correspond to natural language contents copied from one or more privacy notifications and/or contents of a privacy policy contained in one or more documents located at one or more pages of a website. An intermediate representation 124 may correspond to a compiled set of triples (e.g., subject, action, object) extracted from the natural language security policy using natural language processing, pattern recognition, and/or one or more classifiers. A security action 126 may correspond to a displayed notification of a detected security policy violation, an automatically filled form for reporting the detected security policy violation, or another measure as detailed herein.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 208 via a network 204. In one example, all or a portion of the functionality of modules 102 may be performed by computing device 202, server 208, and/or any other suitable computing system. For example, it is envisioned that modules 102 of computing device 202 may perform the extracting and parsing procedures, thus generating an intermediate representation locally. Alternatively, modules 242 of server 208 may include an extraction module 244 that extracts a privacy policy from website 240 and a parsing module 246 that performs the parsing. Thus, additional elements 220 of server 208 may include an extracted privacy policy 222 and an intermediate representation 224. Computing device 202 may obtain the intermediate representation 224 by fetching the intermediate representation 224 from server 208.

As will be described in greater detail below, one or more of modules 102 from FIG. 1 may, when executed by at least one processor of computing device 202 and/or server 208, enable computing device 202 and/or server 208 to manage privacy policy violations. For example, and as will be described in greater detail below, one or more of modules 102 may cause computing device 202 and/or server 208 to perform various privacy policy violation management procedures. For example, extraction module 244 may cause computing device 202 and/or server 208 to extract a privacy policy in natural language from a website. Additionally, parsing module 246 may cause computing device 202 and/or server 208 to parse the privacy policy, thereby generating an intermediate representation that denotes a formal policy. Also, comparison module 106 may cause computing device 202 and/or server 208 to compare behavior of the website against the intermediate representation, thereby detecting at least one violation of the formal policy. Further, enforcement module 110 may cause computing device 202 and/or server 208 to enforce the formal policy at least in part by taking a security action in response to the violation.

Computing device 202 generally represents any type or form of computing device capable of reading computer-executable instructions. For example, computing device 202 may be a smartphone, tablet, laptop, desktop, terminal, or any other computing device capable of browsing the World Wide Web. Additional examples of computing device 202 include, without limitation, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 208 generally represents any type or form of computing device that is capable of serving web pages to a web browser. Additional examples of server 208 include, without limitation, security servers, application servers, web servers, storage servers, and/or database servers configured to run certain software applications and/or provide various security, web, storage, and/or database services. Although illustrated as a single entity in FIG. 2, server 208 may include and/or represent a plurality of servers that work and/or operate in conjunction with one another.

Network 204 generally represents any medium or architecture capable of facilitating communication or data transfer. In one example, network 204 may facilitate communication between computing device 202 and server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
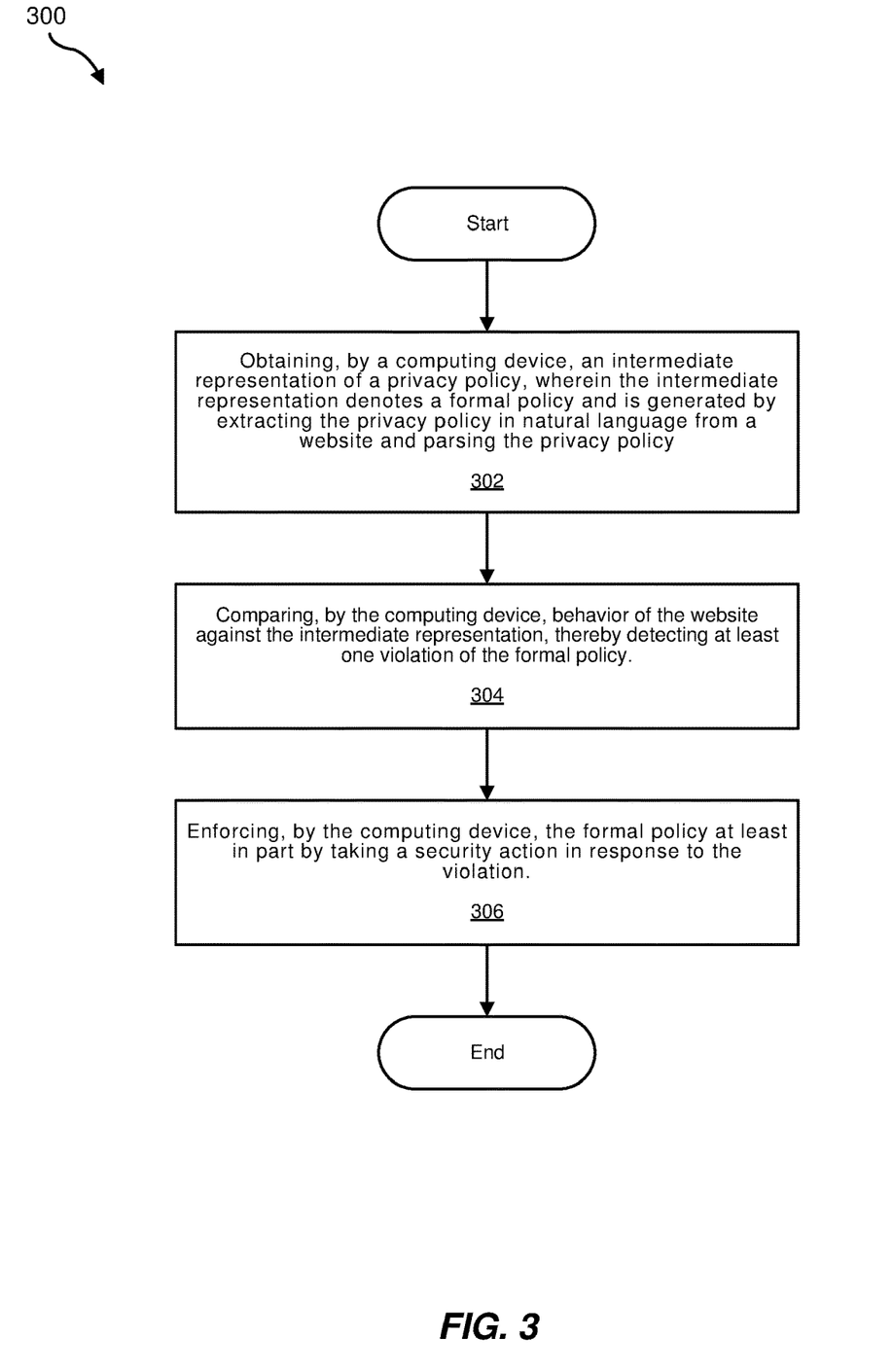
FIG. 3 is a flow diagram of an example method for managing privacy policy violations.

FIG. 3 is a flow diagram of an example computer-implemented method 300 for managing privacy policy violations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may perform security policy violation management procedures. For example, obtainment module 104 may, as part of computing device 202 in FIG. 2, obtain an intermediate representation of a privacy policy, wherein the intermediate representation denotes a formal policy and is generated by extracting the privacy policy in natural language from a website and parsing the privacy policy. In some implementations, obtaining the intermediate representation includes receiving the intermediate representation from server 208 that performs the extracting and the parsing. Additionally or alternatively, obtaining the intermediate representation may include performing, by the computing device 202, at least one of the extracting or the parsing. In some implementations, the extracting may include applying a first extraction technique that involves attempting to identify a cookie banner.

The extracting may include applying a second extraction technique that involves looking for a particular word (e.g., "privacy") on the website in one or more languages, following one or more links associated with the particular word, downloading one or more documents located at the one or more links, determining if the one or more documents look like privacy policies, and recursively following any links found in all of the one or more documents that look like privacy policies. Alternatively or additionally, the extracting may further include, in response to no privacy policy being found by application of the first extraction technique and the second extraction technique, providing a notification to a user and asking the user to find a privacy policy document on a webpage of the website.

As used herein, the term "cookie banner" generally refers to a consent management module on a website that allows users to give their consent to which cookies and trackers they will allow activated to process their personal data. Examples of cookie banners include, without limitation, opt in cookie banners as may be required under data privacy regulations.

Parsing the privacy policy generates an intermediate representation that denotes a formal policy. In some implementations, the parsing may employ one or more natural language processing (NLP) techniques. For example, the parsing may employ a first natural language processing technique that involves semantic role labeling (SRL). Alternatively or additionally, the parsing may employ a second natural language processing technique that involves pattern matching. Alternatively or additionally, the parsing may employ a third natural language processing technique that involves use of a classifier that determines whether a document contains a snippet related to a particular feature of interest. Processing may proceed from step 302 to step 304.

As used herein, the term "natural language processing" generally refers to a subfield of linguistics, computer science, and artificial intelligence concerned with the interactions between computers and human language, in particular how to program computers to process and analyze large amounts of natural language data. Examples of natural language processing include, without limitation, statistical methods and/or neural networks that carry out text and speech processing, morphological analysis, syntactic analysis, lexical semantics (e.g., of individual words in context), relational semantics (e.g., semantics of individual sentences), discourse (e.g., semantics beyond individual sentences), and/or higher level NLP applications.

As used herein, the term "semantic role labeling" (also called shallow semantic parsing or slot-filling) is a process that assigns labels to words or phrases in a sentence that indicate their semantic roles in the sentence, such as that of an agent, goal, or result. Thus, SRL serves to find the meaning of a sentence by converting a natural language utterance to a logical form that a machine can understand. Examples of SRL include, without limitation, machine translation, question answering, ontology induction, automated reasoning, and code generation.

As used herein, the term "pattern matching" generally refers to the process of checking a given sequence of tokens for the presence of the constituents of some pattern. Examples of pattern matching include, without limitation, outputting the locations (if any) of a pattern within a token sequence, outputting some component of the matched pattern, and substituting the matching pattern with some other token sequence (i.e., search and replace).

As used herein, the term "classifier" generally refers to an algorithm that automatically orders or categorizes data into one or more of a set of "classes." One of the most common examples is an email classifier that scans emails to filter them by class label: Spam or Not Spam. Example types of classifiers include, without limitation, Perceptron, Naive Bayes, decision tree, logistic regression, K-nearest neighbor, artificial neural networks/deep learning, support vector machine, and ensemble methods (e.g., Random Forest, Bagging, AdaBoost, etc.).

At step 304, one or more of the systems described herein may perform security policy violation management procedures. For example, comparison module 106 may cause computing device 202 to compare behavior of the website against the intermediate representation, thereby detecting at least one violation of the formal policy. For example, step 304 may include checking one or more requests to add one or more networks to see if they are listed in the privacy policy. Alternatively or additionally, step 304 may include checking one or more requests to one or more third parties to see if they are listed in a privacy policy. Alternatively or additionally, step 304 may include checking a web browser navigation to a third party URL to see if the third party is listed in the privacy policy. Processing may proceed from step 304 to step 306.

At step 306, one or more of the systems described herein may perform security policy violation management procedures. For example, enforcement module 108 may cause computing device 202 to enforce the formal policy at least in part by taking a security action in response to the violation. In some implementations, the security action may include notifying a user of the violation. Alternatively or additionally, the security action may include creating an auto-filled form for a user to submit a complaint to a relevant regulatory body detailing the violation. In additional or alternative examples, the security action may include denying one or more requests to add one or more networks if they are not listed in the privacy policy, denying one or more requests to one or more third parties if they are not listed in a privacy policy, and/or hiding, from a third party not listed in the privacy policy, at least part of one or more requests. For example, the action may entail hiding part of a header, such as a referrer string and/or a user-agent string, hiding a search query in a uniform resource locator (url), and/or hiding at least part of a payload. Following step 306, processing may end.

As used herein, the term "referrer string" generally refers to data, transmitted by a browser when navigating from one website to another, that tells a destination web server what website was previously visited. An example of a referrer string includes, without limitation, contents of HTTP referrer (i.e., an optional HTTP header field that identifies the address of the webpage (i.e., the URI or IRI), which is linked to the resource being requested).

As used herein, the term "user-agent string" generally refers to a part of a request header that identifies which browser is being used, what version, and on which operating system. An example of a user-agent string includes, without limitation, a user-agent string in an HTTP request header.

Figure 4:
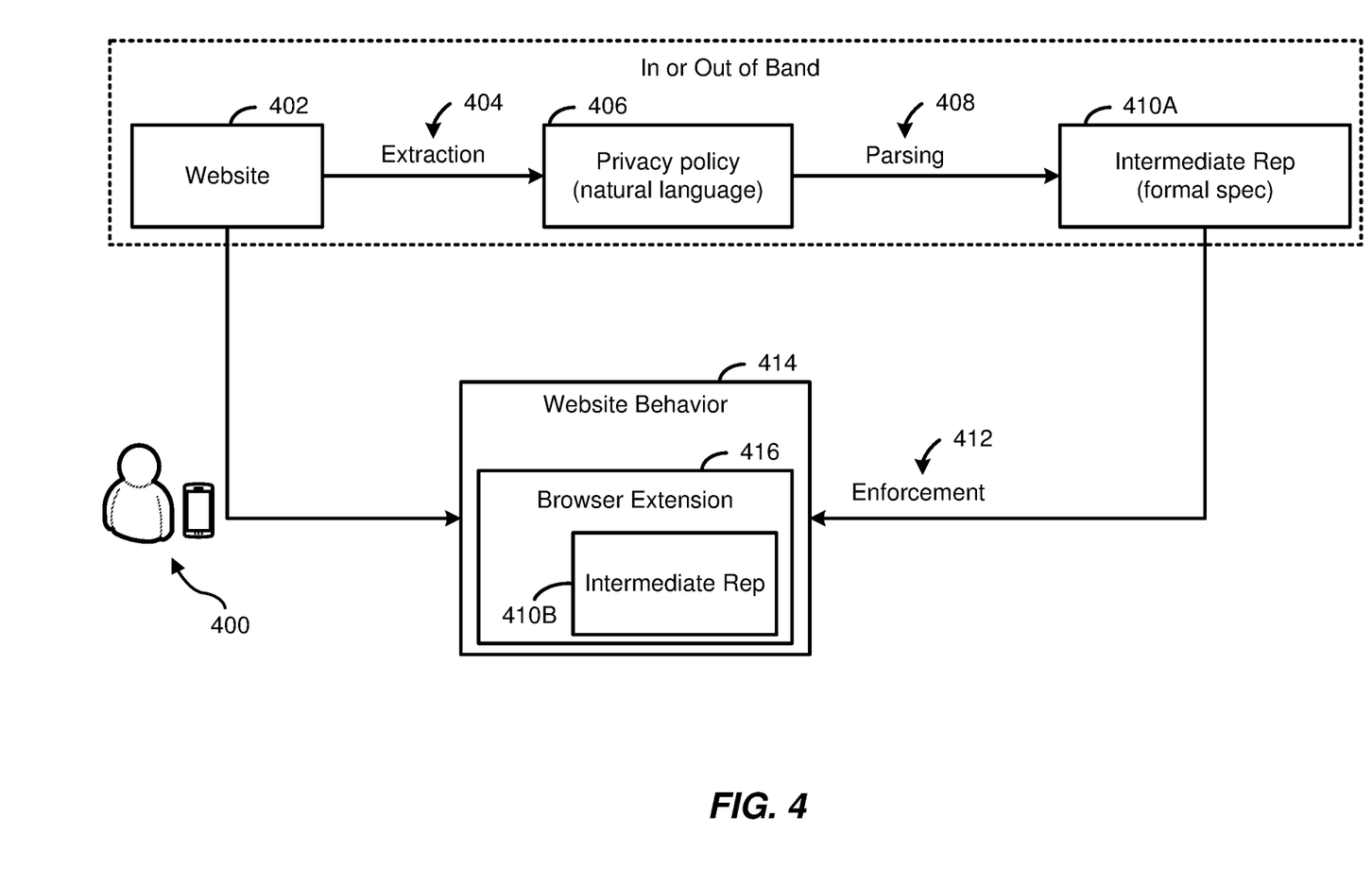
FIG. 4 is a block diagram illustrating an example method for managing privacy policy violations.

Turning to FIG. 4, an example implementation of the privacy policy violation management system is shown. In the example, a user of a computing device 400, such as a smartphone, navigates to a website 402 having a privacy policy (e.g., privacy notification). The system performs privacy policy extraction 404 by using multiple techniques to find privacy policy-related content on the website. First, the system tries to identify any "cookie banner" which may be displayed before any other site interaction is possible. Second, it looks for the word "privacy" on the website in multiple languages and follows the links. The system will download any document at the link location and determine if that document looks like a privacy policy. A one-class classifier trained using the OPP-115 corpus (i.e., a collection of website privacy policies) is used to determine whether a given document is likely to be a privacy policy or not. Links within documents are followed recursively to identify further documents (e.g., a separate cookie policy). When no privacy policy is found, a web browser extension 416 may optionally engage the user of computing device 400 and ask them to find the privacy policy document on the page. This crowd-sourcing approach can then be filtered through the method mentioned above.

The privacy policy extraction 404 results in a natural language privacy policy 406 that the system subjects to parsing 408. For example, using advanced techniques in natural language processing such as SRL, the system can identify the semantic role of words (e.g., agent, goal, or result), even when worded vaguely, and extract triples (such as {we, collect, ip address} or {ip address, share, with google}). Other techniques used can be pattern matching or a simple classifier which determines whether a document contains a snippet related to particular features of interest. The extracted triples are then compiled down to an intermediate representation 410A, similar to Content-Security Policies for webpages.

The system may use the intermediate representation 410A for enforcement. For example, if the intermediate representation 410A has been developed out of band by a server and/or through crowd sourcing efforts, then the web browser extension 416 may obtain a copy 410B of the intermediate representation and use it for enforcement. However, it is envisioned that the web browser extension 416 may also be capable of performing the extraction and parsing in band on the local computing device for those circumstances in which an intermediate representation 410A is not already available or is not recent or up to date.

Figure 5:
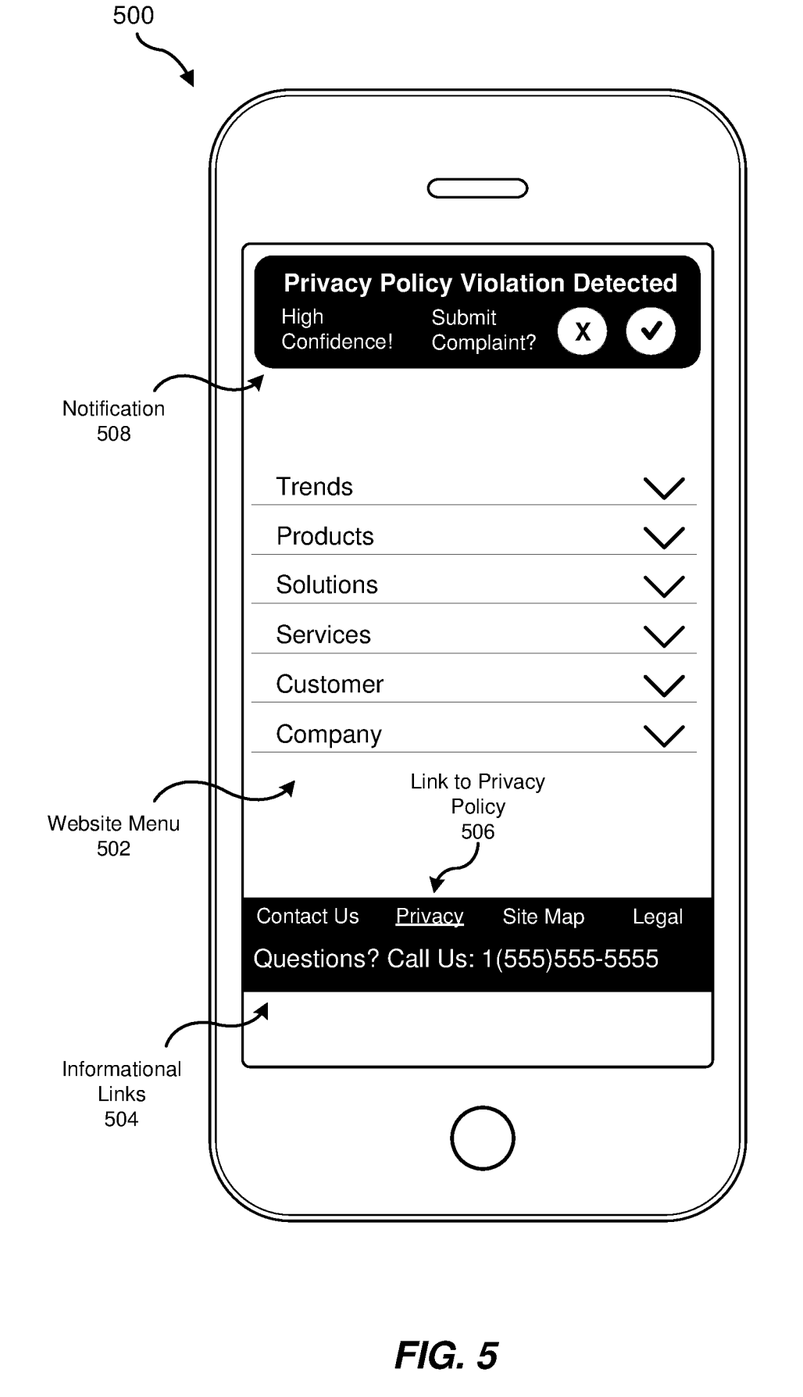
FIG. 5 is a view illustrating one or more security actions implemented according to an example method for managing privacy policy violations.

The web browser extension 416 may perform the enforcement 412 by enforcing one or more of the triples in the intermediate representation by comparing them against attempted website behavior 414. For example, the web browser extension 416 may deny requests to ad networks if they are not listed in the policy. Alternatively or additionally, the web browser extension 416 may deny requests to third parties if they are not listed in the policy. Alternatively or additionally, the web browser extension 416 may hide, from third parties if they are not listed in the policy, at least part of one or more requests, such as user-agent strings, "Referrer" strings, search queries in URLs, and/or portions of payloads. These violations may be surfaced to the user if found, together with a confidence level as shown in FIG. 5. If the infraction is sufficiently severe, the extension may also create an auto-filled form to submit a complaint to a relevant regulatory body detailing the infraction.

Referring to FIG. 5, an example security measure is demonstrated with reference to an example computing device 500 depicted as a smartphone. In this example, the touchscreen of the smartphone displays a webpage having a website menu 502 of links that may be selected by a user. The webpage also displays various informational links 504 to additional information, including a link 506 to a privacy policy. The link is labeled "privacy," so a browser extension of the computing device 500 may retrieve documents at the link and generate an intermediate representation as previously described. Alternatively, the browser extension may fetch the intermediate representation from a server as previously described. In this example, the user may select a link in the menu 502 that redirects to a website of a third party not listed in the privacy policy. The browser extension may detect this violation and perform various security actions, such as preventing navigation to the third party website and displaying a notification 508 informing the user of the privacy policy violation. The confidence level may be one of a few or several confidence levels (e.g., low, medium, high). The level of confidence may be predefined for the type of violation. Alternatively or additionally, the level of confidence may be based on a confidence level associated with the parsing of the privacy policy. Alternatively or additionally, the confidence level may be based on a combination of such factors. As the confidence level is high in this example, the browser extension may automatically fill a form for reporting the violation to a relevant regulatory authority. The user may be presented with the filled form and/or prompted to select whether to send the filled form. Such a prompt may be included in notification 508 as shown. If the user selects to continue to the website of the third party the browser extension may hide at least part of one or more request as previously described.

Figure 6:
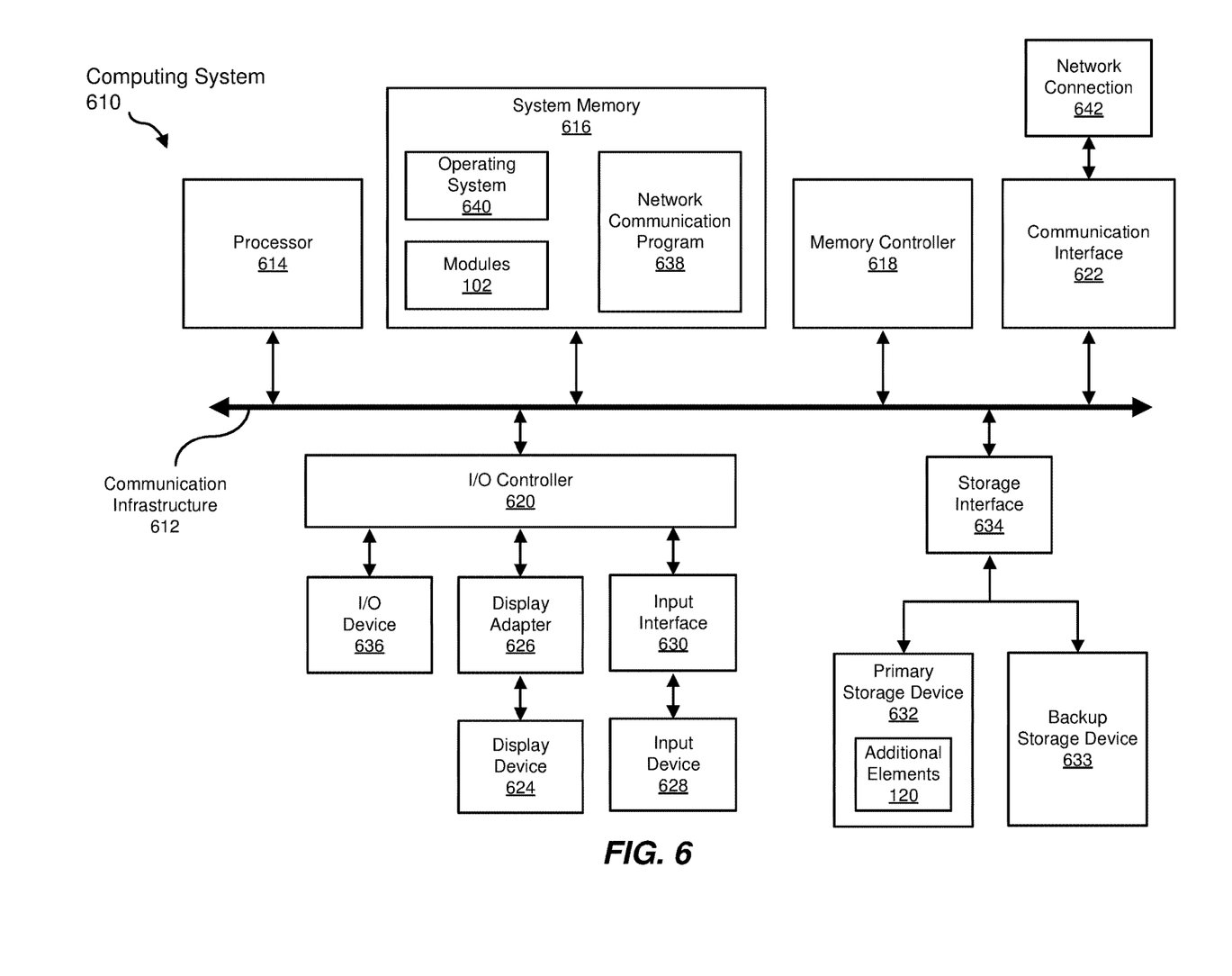
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
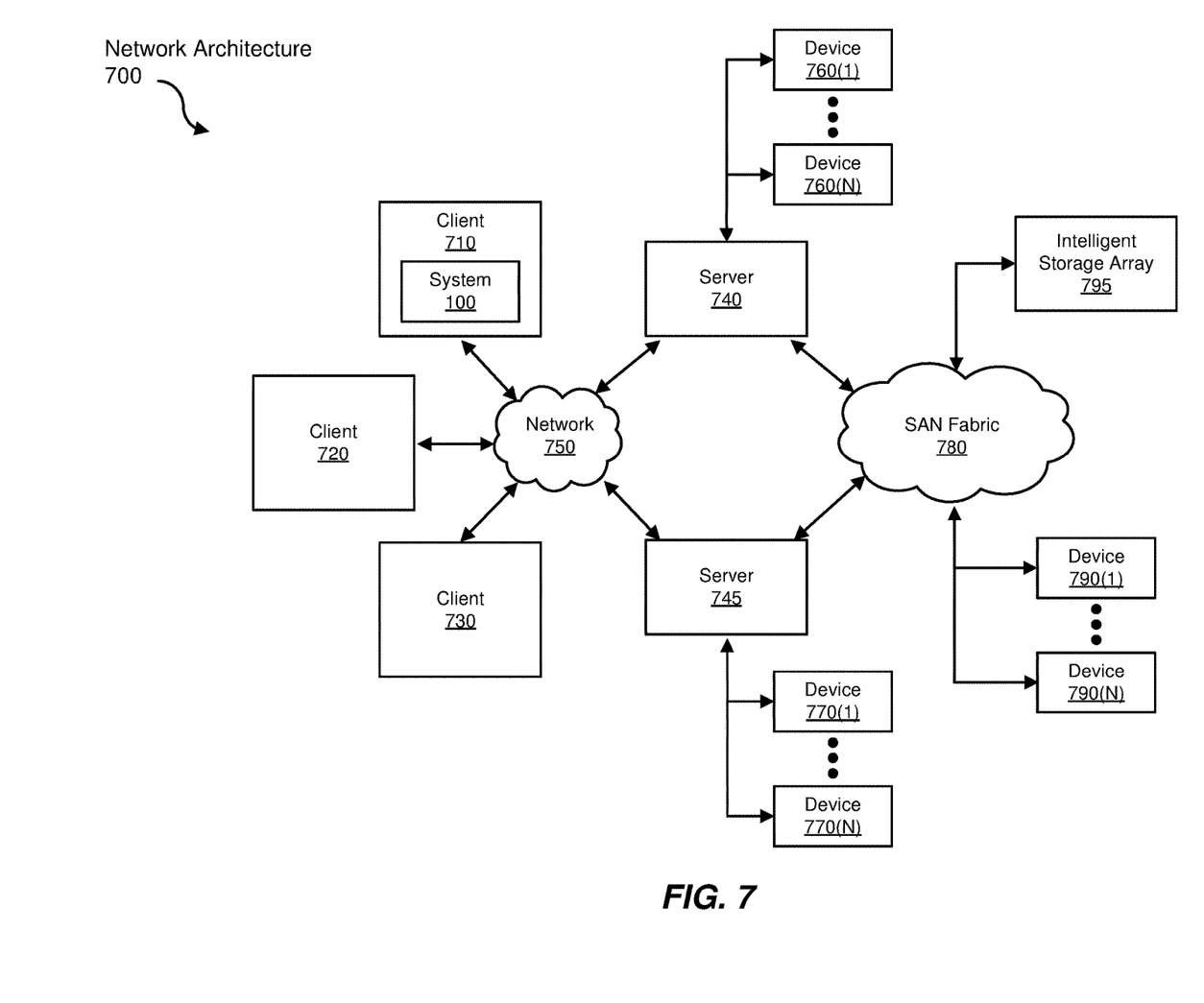
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for managing privacy policy violations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive privacy policy content to be transformed, transform the privacy policy content, output a result of the transformation to an intermediate representation, use the result of the transformation to detect one or more privacy policy violations, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing privacy policy violations, at least a portion of the method being performed by a computing device comprising at least one processor, the method comprising:
    obtaining, by the computing device, an intermediate representation of a privacy policy, wherein the intermediate representation denotes a formal policy and is generated by extracting the privacy policy in natural language from a website and parsing the privacy policy, wherein the extracting includes:
    (a) looking for a particular word on the website in one or more languages;
    (b) following one or more links associated with the particular word;
    (c) downloading one or more documents located at the one or more links;
    (d) determining if the one or more documents look like privacy policies; and
    (e) recursively following any links found in all of the one or more documents that look like privacy policies;
    comparing, by the computing device, behavior of the website against the intermediate representation, thereby detecting at least one violation of the formal policy; and
    enforcing, by the computing device, the formal policy at least in part by taking a security action in response to the violation.

2. The method of claim 1, wherein the security action includes denying one or more requests to add one or more networks if they are not listed in the privacy policy.

3. The method of claim 1, wherein the security action includes notifying a user of the violation.

4. The method of claim 1, wherein the security action includes creating an auto-filled form for a user to submit a complaint to a relevant regulatory body detailing the violation.

5. The method of claim 1, wherein the security action includes hiding, from a third party not listed in the privacy policy, at least part of one or more requests, wherein the hiding includes hiding at least one of:
    one or more user-agent strings;
    one or more referrer strings;
    one or more search queries in one or more Uniform Resource Locators (URLs); or
    one or more portions of one or more payloads.

6. The method of claim 1, wherein the computing device carries out the obtaining, comparing, and enforcing by enacting computer-readable instructions that are packaged as a browser extension.

7. The method of claim 1, wherein the extracting includes attempting to identify a cookie banner.

8. The method of claim 7, wherein the extracting further includes, in response to no privacy policy being found, providing a notification to a user and asking the user to find a privacy policy document on a webpage of the website.

9. The method of claim 1, wherein the parsing employs at least one natural language processing technique that involves use of a classifier that determines whether a document contains a snippet related to a particular feature of interest.

10. A system for managing privacy policy violations, the system comprising:
- at least one physical processor; and
- physical memory comprising computer-executable instructions that, when executed by the physical processor, cause the physical processor to:
  - obtain an intermediate representation of a privacy policy, wherein the intermediate representation denotes a formal policy and is generated by extracting the privacy policy in natural language from a website and parsing the privacy policy, wherein the extracting includes:
    - (a) looking for a particular word on the website in one or more languages;
    - (b) following one or more links associated with the particular word;
    - (c) downloading one or more documents located at the one or more links;
    - (d) determining if the one or more documents look like privacy policies; and
    - (e) recursively following any links found in all of the one or more documents that look like privacy policies;
  - compare behavior of the website against the intermediate representation, thereby detecting at least one violation of the formal policy; and
  - enforce the formal policy at least in part by taking a security action in response to the violation.

11. The system of claim 10, wherein the security action includes denying one or more requests to add one or more networks if they are not listed in the privacy policy.

12. The system of claim 10, wherein the security action includes notifying a user of the violation.

13. The system of claim 10, wherein the security action includes creating an auto-filled form for a user to submit a complaint to a relevant regulatory body detailing the violation.

14. The system of claim 10, wherein the security action includes hiding, from a third party not listed in the privacy policy, at least part of one or more requests, wherein the hiding includes hiding at least one of:
- one or more user-agent strings;
- one or more referrer strings;
- one or more search queries in one or more Uniform Resource Locators (URLs); or
- one or more portions of one or more payloads.

15. The system of claim 10, wherein the computer-executable instructions are packaged as a browser extension.

16. The system of claim 10, wherein the extracting includes attempting to identify a cookie banner.

17. The system of claim 16, wherein the extracting includes, in response to no privacy policy being found, providing a notification to a user and asking the user to find a privacy policy document on a webpage of the website.

18. The system of claim 10, wherein the parsing is performed by employing at least one natural language processing technique that involves use of a classifier that determines whether a document contains a snippet related to a particular feature of interest.

19. A non-transitory computer-readable medium comprising one or more computer-executable instructions that, when executed by at least one processor of a computing device, cause the computing device to:
- obtain an intermediate representation of a privacy policy, wherein the intermediate representation denotes a formal policy and is generated by extracting the privacy policy in natural language from a website and parsing the privacy policy, wherein the extracting include:
  - (a) looking for a particular word on the website in one or more languages;
  - (b) following one or more links associated with the particular word;
  - (c) downloading one or more documents located at the one or more links;
  - (d) determining if the one or more documents look like privacy policies; and
  - (e) recursively following any links found in all of the one or more documents that look like privacy policies;
- compare behavior of the website against the intermediate representation, thereby detecting at least one violation of the formal policy; and
- enforce the formal policy at least in part by taking a security action in response to the violation.

20. The non-transitory computer-readable medium of claim 19, wherein the security action includes notifying a user of the violation.

* * * * *